US012741892B2

(12) United States Patent
Lee et al.

(10) Patent No.: US 12,741,892 B2
(45) Date of Patent: Sep. 22, 2026

(54) FILTER FOR CONTROLLING pH OF PURIFIED WATER AND WATER PURIFIER INCLUDING THE SAME

(71) Applicant: COWAY Co., Ltd., Gongju-si (KR)

(72) Inventors: Sang-Young Lee, Gongju-si (KR); Min-Kyoon Ahn, Gongju-si (KR); Won Tae Kim, Gongju-si (KR); Mo Young Gu, Gongju-si (KR); Dae Sik Kang, Gongju-si (KR)

(73) Assignee: COWAY Co., Ltd., Gongju-si (KR)

( * ) Notice: Subject to any disclaimer, the term of this patent is extended or adjusted under 35 U.S.C. 154(b) by 466 days.

(21) Appl. No.: 18/457,508

(22) Filed: Aug. 29, 2023

(65) Prior Publication Data

US 2024/0076215 A1 Mar. 7, 2024

(30) Foreign Application Priority Data

Sep. 2, 2022 (KR) ........................ 10-2022-0111584
May 3, 2023 (KR) ........................ 10-2023-0057668

(51) Int. Cl.
*C02F 1/68* (2023.01)

(52) U.S. Cl.
CPC .............. *C02F 1/687* (2013.01); *C02F 1/681* (2013.01); *C02F 2209/06* (2013.01)

(58) Field of Classification Search
CPC ...... C02F 1/687; C02F 1/681; C02F 2209/06; C02F 2001/425; C02F 2201/006; C02F 1/441; C02F 1/281; C02F 1/42; C02F 1/66
USPC .......................................................... 210/749
See application file for complete search history.

(56) References Cited

U.S. PATENT DOCUMENTS 5,662,799 A * 9/1997 Hudgens .................. F01P 11/06 210/209
6,660,167 B1 * 12/2003 Walder .................. C02F 1/5236 210/748.01
2004/0091654 A1 * 5/2004 Kelly ...................... F01P 11/06 428/35.7
2014/0209544 A1 * 7/2014 Poffet ...................... C02F 1/68 210/749

FOREIGN PATENT DOCUMENTS

KR 10-0688332 B1 3/2007
KR 20-2009-0000099 A1 1/2009
KR 10-2495577 B1 2/2023

* cited by examiner

*Primary Examiner* — Hayden Brewster
(74) *Attorney, Agent, or Firm* — Oblon, McClelland, Maier & Neustadt, L.L.P.

(57) ABSTRACT

A filter for controlling a pH of purified water is disclosed. The pH-controlling filter according to an aspect of the present disclosure may include a water permeable filter having a hollow formed in a center of a cross-section from one end to the other end; a lower stopper closing a lower end of the water permeable filter, a filling unit inserted into the hollow of the water permeable filter to form an inner space, the filling unit having an inlet through which the purified water passing through the water permeable filter flows into the inner space and an outlet through which the purified water passing through the inner space flows out; and control particles filled in the inner space of the filling unit to adjust a pH of the purified water passing through the inner space of the filling unit and comprising OH group-generating particles configured to supplement the purified water passing through the inner space with OH groups.

10 Claims, 12 Drawing Sheets

FILTER FOR CONTROLLING pH OF PURIFIED WATER AND WATER PURIFIER INCLUDING THE SAME

CROSS-REFERENCE TO RELATED APPLICATION

This application claims priority to and the benefit of Korean Patent Application No. 10-2022-0111584, filed on Sep. 2, 2022, the disclosures of which is incorporated herein by reference in its entirety.

FIELD

The present disclosure relates to a filter for controlling a pH of purified water (hereinafter, referred to as "pH-controlling filter") and a water purifier including the same, and more particularly, to a pH-controlling filter capable of adjusting a pH of a filtered purified water and a water purifier including the same.

BACKGROUND

As environmental pollution increases, and interest in health increases, the use of water purifiers is increasing. These water purifiers include a direct connection type directly connected to a faucet and a storage type that puts water in a container and passes it through a filter, depending on the type of raw water supply, and a natural filtration type, a direct connection filtration type, an ion exchange resin type, a distillation type, and a reverse osmosis type, depending on water purification methods.

Meanwhile, the reverse osmosis method among the water purification methods is a method of water purification by using the osmosis phenomenon in reverse, and has an advantage of using a semi-permeable membrane with very fine pores, and having excellent ability to remove fine substances such as heavy metals and contaminants.

It is mainly used in areas where there are many calcareous components in the raw water supplied by using these characteristics or where groundwater with severe pollution is used.

On the other hand, the reverse osmosis method may filter only pure water by filtering even minerals contained in water, and all ions contained in the water are removed during a filtering process. As the ions are removed, carbon dioxide contained in the water is combined with the water, and thus the pH of the water is reduced to a level of 5.5 to 6.5, thereby making it weakly acidic.

However, there is a problem in that the pH of drinking water filtered by the reverse osmosis method deviates from the drinking water recommendation standard of some countries because the pH recommendation standard of drinking water in some countries is 6.5 to 8.5.

The Korean Utility Model Publication No 20-2009-0000099 relates to a water purification device using a ball for water purification, and discloses a water purification device that has increased lifetime by supplying raw water to a filter having a plurality of water purification balls embedded therein, providing a flow rate control valve capable of controlling the pH of the purified water, allowing all of the raw water in the filter to be discharged when the filter is not used as a water purification function, and allowing water purification ball to be precipitated in raw water only when it is used for a water purification function, and preventing the water purification ball from being precipitated in the raw water when use is stopped.

However, this causes an increase in cost because an additional valve is further configured to the water filter, etc. and has not solved the problem in that an excessive pH adjusting components is eluted from the water purification ball during initial use of the purified water filter.

The Korean Patent Registration No. 10-0688332 is an invention related to a separation membrane module of a water purifier filter, and discloses a separation membrane module provided with a separation membrane that primarily filters liquids, a carbon block for secondary filtration of a liquid primarily filtered by a separation membrane and a filling part inserted inside the carbon block for tertiary filtration of the secondary filtered liquid from the carbon block. Although a structure that can be simply combined without using an adhesive is disclosed, there is a problem in that it does not play a role in adjusting the pH of filtered purified water to meet the drinking water standard.

Further, the Korean Patent Registration No 10-2495577 discloses a filter for a water purifier, which includes a filter housing, a functional filter, and a water purifying filter for filtering raw water bypassing the functional filter so as to dualize a fluid passage through which raw water flows and dispose a multi-stage water purifying filter to perform water purification, and thus improves excessive elution of fillers from the functional filter arranged in a row within the filter housing in an initial state, but this has a problem in that the filter module structure is complicated and manufacturing costs are increased.

SUMMARY

The present disclosure has been made in view of the above problems, and it is an object of the present disclosure to provide a pH-controlling filter capable of adjusting a pH of a purified water filtered by a reverse osmosis method to be within a pH range of a drinking water recommendation and a purifier including the same.

According to an embodiment of the present disclosure, it is an object of the present disclosure to provide a pH-controlling filter and a water purifier including the same, which have a simple structure to adjust pH, thereby facilitating manufacturing and reducing manufacturing costs, and a water purifier including the same.

According to an embodiment of the present disclosure, it is an object of the present disclosure to provide a pH-controlling filter and a water purifier including the same, which is capable of quickly entering the recommended pH range of drinking water from the early stages of using the filter by adjusting pH control particles that are over-eluted at the beginning of use of the filter.

The technical problems of the present disclosure are not limited to the above-mentioned technical problems, and other technical problems not mentioned may be clearly understood by those skilled in the art from the following description.

According to an aspect of the present disclosure, there is disclosed a pH-controlling filter including: a water permeable filter having a hollow formed in a center of a cross-section from one end to the other end; a lower stopper closing a lower end of the water permeable filter; a filling unit inserted into the hollow of the water permeable filter to form an inner space, the filling unit having an inlet through which the purified water passing through the water permeable filter flows into the inner space and an outlet through which the purified water passing through the inner space flows out; and control particles filled in the inner space of the filling unit to adjust a pH of the purified water passing through the inner space of the filling unit and comprising OH group-generating particles configured to supplement the purified water passing through the inner space with OH groups.

In some embodiments, the OH group-generating particles may be ceramic balls including magnesium or potassium.

In some embodiments, the control particles may further include a cation exchange resin for supplementing cations in the purified water passing through the inner space of the filling unit.

In some embodiments, the cation exchange resin may include at least one of H+ form and Na+ form.

In some embodiments, the control particles may be filled in a volume of 30% to 80% of the volume of the inner space of the filling unit.

In some embodiments, the filling unit may be disposed in the hollow of the water permeable filter to form its inner space, its lower surface facing the lower stopper may be closed, its side surface facing an inner circumferential surface of the hollow may be formed with a plurality of slits so as to be opened, and its upper surface may be opened to discharge the purified water in its inner space to an upper side of the hollow of the water permeable filter.

In some embodiments, the filling unit may be disposed in the hollow of the water permeable filter to form its inner space, its lower surface facing the lower stopper may be opened to allow the purified water to flow into the inner space, its side surface facing the inner circumferential surface of the hollow may be closed, and its upper surface may be opened to discharge the purified water in its inner space to an upper side of the hollow of the water permeable filter.

In some embodiments, the filling unit may be disposed in the hollow of the water permeable filter to form its inner space, its lower surface facing the lower stopper and its side surface facing the inner circumferential surface of the hollow may be opened to allow the purified water to flow into its inner space, and its upper surface may be opened to discharge the purified water in its inner space to an upper side of the hollow of the water permeable filter.

According to another aspect of the present disclosure, there is disclosed a water purifier including: a reverse osmosis filter for filtering raw water; and a filter for controlling a pH of purified water, which is installed on the downstream side of the reverse osmosis filter and configured to adjust the pH of the purified water filtered through the reverse osmosis filter, wherein the pH-controlling filter may include: a water permeable filter having a hollow formed in a center of a cross-section from one end to the other end; a lower stopper closing a lower end of the water permeable filter; a filling unit inserted into the hollow of the water permeable filter to form an inner space, the filling unit having an inlet through which the purified water passing through the water permeable filter flows into the inner space and an outlet through which the purified water passing through the inner space flows out; and control particles filled in the inner space of the filling unit to adjust a pH of the purified water passing through the inner space of the filling unit and comprising OH group-generating particles configured to supplement the purified water passing through the inner space with OH groups.

In some embodiments, the water purifier may further include: a water outlet nozzle configured to discharge the purified water having a pH adjusted by the pH-controlling filter; and a water outlet flow path configured to guide the purified water passing through the pH-controlling filter to the water outlet nozzle.

Alternatively, the water purifier may further include: a purified water tank in which the purified water having the pH adjusted in the pH-controlling filter is stored; and a purified water guide flow path for guiding the purified water passing through the pH-controlling filter to the purified water tank.

According to the above configuration, the pH-controlling filter and the water purifier including the same according to the present disclosure have the effect of adjusting the pH of the purified water filtered by the reverse osmosis filter to reach the pH within the recommended standard range for drinking water.

The pH-controlling filter and the water purifier including the same according to the embodiment of the present disclosure are particles for adjusting the pH of the purified water, and include not only OH group-generating particles but also cation exchange resins, so that the purified water belonging to the pH within the recommended standard range for drinking water may be quickly provided from the early use of the filter.

It should be understood that the effects of the present disclosure are not limited to the above effects, and include all effects that can be inferred from the construction of the invention described in the detailed description or the claims of the present disclosure.

DETAILED DESCRIPTION

Figure 1:
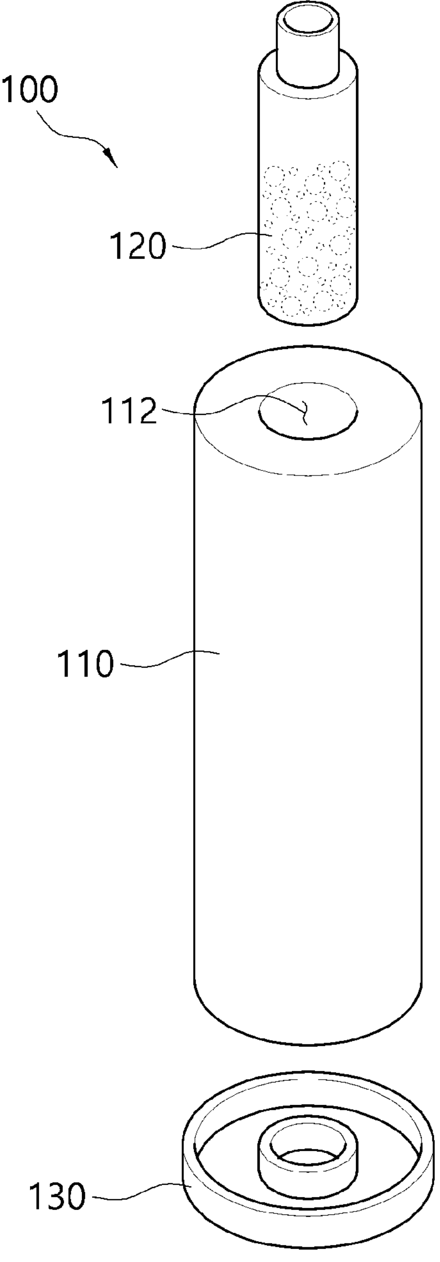
FIG. 1 is a diagram illustrating a pH-controlling filter according to an embodiment of the present disclosure.

Hereinafter, embodiments of the present disclosure will be described in detail with reference to the accompanying drawings so that those skilled in the art can easily carry out the present disclosure. The present disclosure may be embodied in various different forms and is not limited to the embodiments described herein. In order to clearly describe the present disclosure, parts not related to the description are omitted in the drawings, and the same reference numerals are used to refer to the same or similar components throughout the specification.

The words and terms used in the specification and the claims are not interpreted as limited to ordinary or dictionary meanings, but should be interpreted as meanings and concepts corresponding to technical aspects of the present disclosure according to principles capable of defining terms and concepts by the inventor in order to best describe the invention.

Therefore, the configurations described in the specification and illustrated in the drawings correspond to preferred embodiments of the present disclosure and do not all alter the technical aspects of the present disclosure, and thus the configurations may include various equivalents and modifications to replace them in the present application.

In the specification, it is to be understood that the terms such as "include" or "have" are intended to describe the presence of features, numbers, steps, operations, components, parts or combinations thereof described in the specification, and do not preclude the presence or addition of one or more other features, numbers, steps, operations, components, parts or combinations thereof.

It is to be understood that a certain component is located in the "front", "rear", "upper" or "lower" of another component, unless otherwise defined, not only is located in the "front", "rear", "upper" or "lower" immediately adjacent to the other component, but also is located in the middle of the other component. In addition, it is to be understood that a certain component is "connected" to another component, unless otherwise defined, not only is directly connected to the other component, but also is indirectly connected to the other component.

Hereinafter, a filter for controlling a pH of purified water (i.e., referred to as "pH-controlling filter") according to an embodiment of the present disclosure will be described with reference to the drawings.

FIG. 1 is an exploded perspective view illustrating a pH-controlling filter according to an embodiment of the present disclosure.

The pH-controlling filter 100 according to an embodiment of the present disclosure may be installed on the downstream side of the reverse osmosis filter in the flow of purified water so that purified water filtered through the reverse osmosis filter flows in the reverse osmosis type water purifier.

The reverse osmosis filter filters only pure water by filtering even minerals contained in water. And then all ions contained in the water are removed during a filtering process. As the ions are removed, carbon dioxide contained in the water is combined with the water, and thus the pH of the water is reduced to a level of 5.5 to 6.5, thereby making it weakly acidic.

Figure 2:
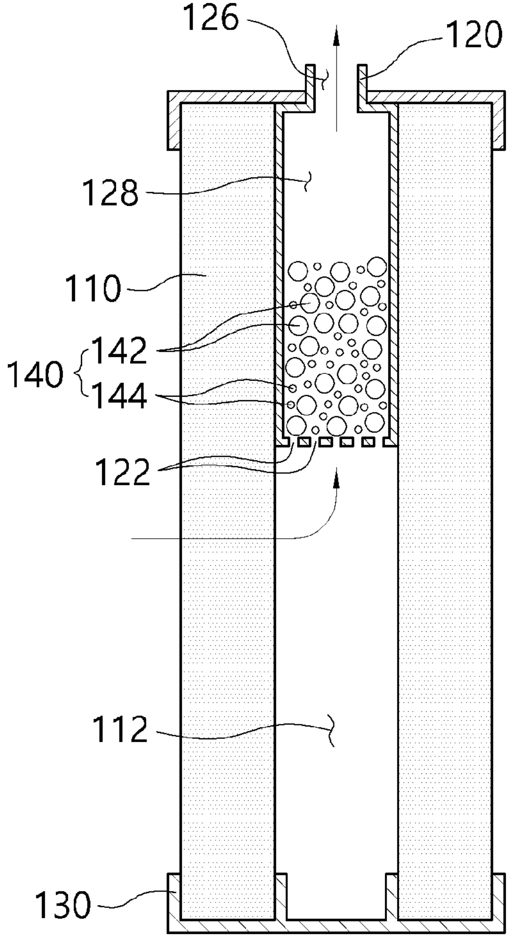
FIG. 2 is a cross-sectional view of a pH-controlling filter according to an embodiment of the present disclosure.

As shown in FIGS. 1 and 2, the pH-controlling filter 100 according to an embodiment of the present disclosure may include a water permeable filter 110, a lower stopper 130, a filling unit 120, and control particles 140.

The water permeable filter 110 may be formed in a cylindrical shape, and a hollow 112 may be formed in a center of a cross-section from one end to the other end in the longitudinal direction. The water permeable filter 110 may be formed of a water permeable material through which water is filtered while permeating. In an embodiment of the present disclosure, the water permeable filter 110 may be formed of a carbon block obtained by sintering carbon particles, a sponge containing carbon particles, or the like. Of course, the present disclosure is not limited thereto, and any material or form may be used as long as water can be filtered.

The lower stopper 130 is a cap that closes the lower end of the water permeable filter 110, and may be made of a material such as plastic.

The lower stopper 130 may be formed to block both the lower end of the water permeable filter 110 and the lower end of the hollow 112.

Meanwhile, the filling unit 120 may be inserted into the hollow 112 of the water permeable filter 110.

The filling unit 120 may be inserted into the hollow 112 of the water permeable filter 110, and may have an inner space 128 filled with control particles 140 for adjusting the pH of the purified water, and an inlet 122 through which the purified water permeable passing through the water permeable filter 110 flows into the inner space 128 of the filling unit 120 and an outlet 126 through which the purified water with adjusted pH by passing through the particles flows out.

In the embodiment of the present disclosure, the inlet 122 is formed at a lower end of the filling unit 120, and the outlet 126 is formed at an upper end of the filling unit 120 as an example.

Further, the outlet 126 of the filling unit 120 is located at an upper end of the water permeable filter 110 as an example.

In addition, the filling unit 120 may have a length shorter than the length of the hollow 112 of the water permeable filter 110. Accordingly, the hollow 112 of the filling unit 120 may have an empty space that is not filled with the filling unit 120 in the lower portion thereof.

Since the lower stopper 130 is installed at the lower end of the permeable filter 110 and the filling unit 120 is installed at the upper end of the permeable filter 110, purified water introduced into the permeable filter 110 is not directly introduced into the hollow 112 of the permeable filter 110 but flows into the hollow 112 of the permeable filter 110 through the circumference surface of the permeable filter 110.

In addition, the purified water introduced into the hollow 112 may be controlled to have a pH adjusted while passing through the control particles 140 of the filling unit 120 through the inlet 122 formed at the lower end of the filling unit 120.

The purified water having a pH adjusted while passing through the control particles 140 may be discharged through the outlet 126 formed at the upper end of the filling unit 120.

Figure 3:
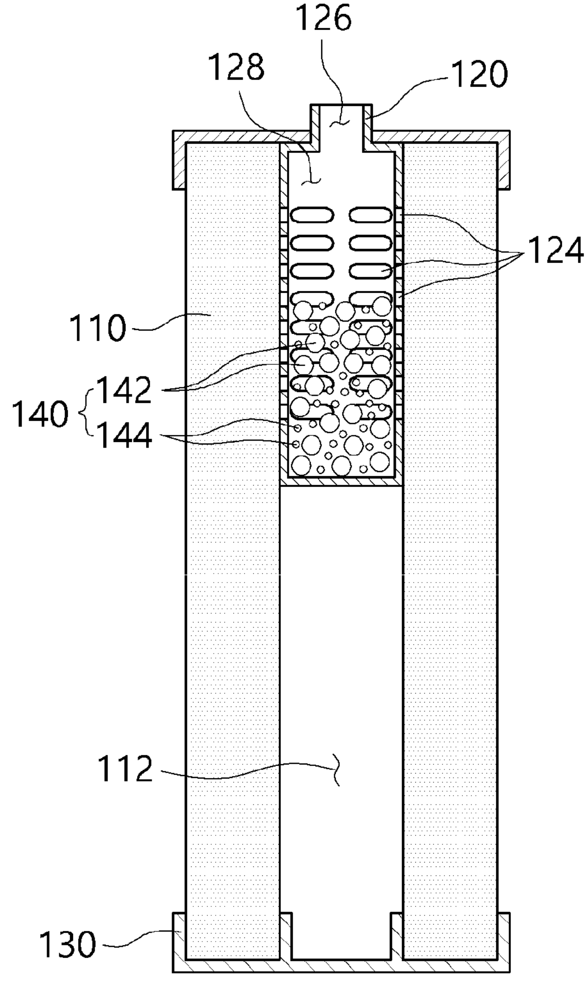
FIG. 3 is a cross-sectional view of a pH-controlling filter according to another embodiment of the present disclosure.

Of course, as shown in FIG. 3, the inlet 122 may not be formed at the lower end of the filling unit 120, but may be formed as a side aperture 124 formed at a circumferential side surface of the filling unit 120.

That is, the water passing through the water permeable filter 110 may be introduced into the inner space 128 of the filling unit 120 through the side aperture 124 of the filling unit 120, and may be discharged through the outlet 126 after the pH is adjusted while passing through the control particles 140.

Figure 4:
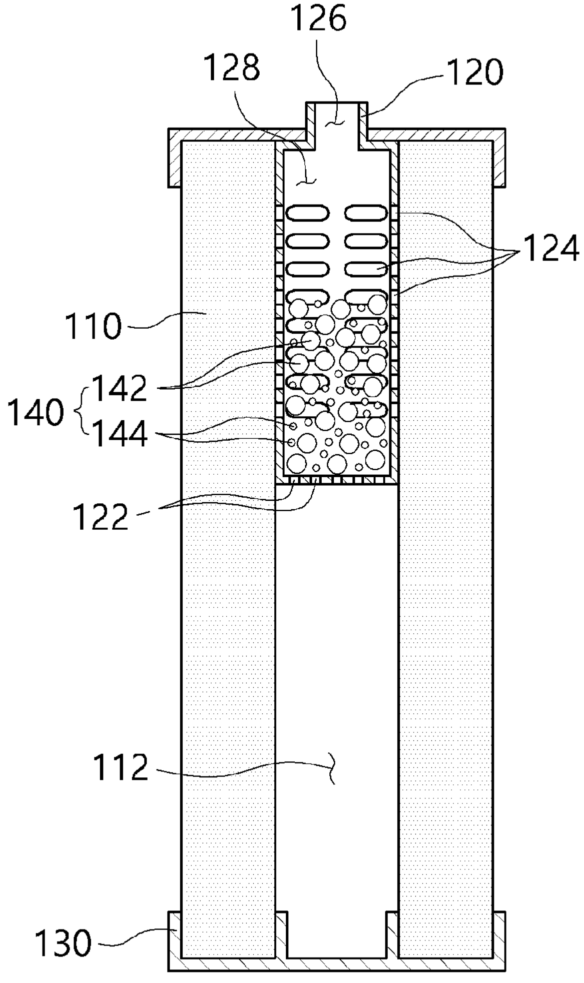
FIG. 4 is a cross-sectional view of a pH-controlling filter according to another embodiment of the present disclosure.

Alternatively, as shown in FIG. 4, the inlet 122 may be formed at the lower end of the filling unit 120, and the side aperture 124 may be formed at the circumferential side.

That is, the water passing through the water permeable filter 110 may be introduced into the inner space 128 of the filling unit 120 through the side aperture 124 of the filling unit 120 and the inlet 122 at the lower end thereof and may be discharged through the outlet 126 after the pH is adjusted while passing through the control particles 140.

The control particles 140 is a particle for adjusting the pH of the purified water flowing around, and may be OH group-generating particles 142.

That is, the purified water passing through the reverse osmosis filter is filtered to all of the ions contained in the water due to the filtration method of the reverse osmosis filter, and thus the pH is lowered. The pH of the purified water increases again by supplementing the OH group in the water having the lowered pH.

In this case, the OH group-generating particles 142 may be ceramic balls including magnesium or potassium.

On the other hand, when the OH group-generating particles (142) are initially used, the OH group is generated in excess too much, and the pH of the purified water passing through the filling unit (120) may exceed a recommended range.

Of course, this may vary depending on the filling amount of the OH group-generating particles 142 or the magnesium-containing concentration of the ceramic ball containing magnesium or potassium used as the OH group-generating particles 142.

However, since the OH group replenishment capacity of the OH group-generating particles 142 have to be maintained until the life of the water permeable filter 110 is complete, a problem may occur in that an amount of OH group replenishment is excessive when the filter is initially used.

To compensate for this, the control particles 140 filled in the filling unit 120 may include a cation exchange resin 144.

The cation exchange resin 144 may neutralize an excess amount of OH groups supplemented from the OH group-generating particles 142 by supplementing cations in permeated purified water, thereby suppressing an excessive increase in pH.

The cation exchange resin 144 may include at least one of H+ foam and Na+ foam.

In this case, the amount of cations supplemented by the cation exchange resin 144 may be less than the amount of OH groups supplemented by the OH group-generating particles 142.

That is, the cation supplemented in the cation exchange resin 144 neutralizes some of the OH groups supplemented in the OH group-generating particles 142.

In addition, the life of the cation exchange resin 144 may be shorter than that of the OH group-generating particles 142.

This is because the amount of OH groups supplemented by the OH group-generating particles 142 is excessively secreted at the beginning of use, but the amount of OH groups generated decreases as the use time passes.

That is, the cation exchange resin 144 neutralizes the amount of OH groups generated in excess at the initial stage of use of the OH group-generating particles 142.

In addition, the control particles 140 filled in the filling unit 120 may be filled in a volume of 30% to 80% of the volume of the inner space 128 of the filling unit 120.

This is because, when the control particles 140 are excessively filled in the filling unit 120, a channeling phenomenon in which a fixed passage is formed between the particles as a fluid flows may occur, and only some of the control particles 140 filled in the filling unit 120 may be biased and consumed by contact with water.

Accordingly, by filling the control particle 140 in a volume of 30% to 80% of the volume of the inner space 128 of the filling unit 120, the purified water flowing in the inner space 128 of the filling unit 120 flows in the filling unit 120, and the control particles 140 is floated by the flowing water to induce sufficient contact with the control particle 140.

Figure 5:
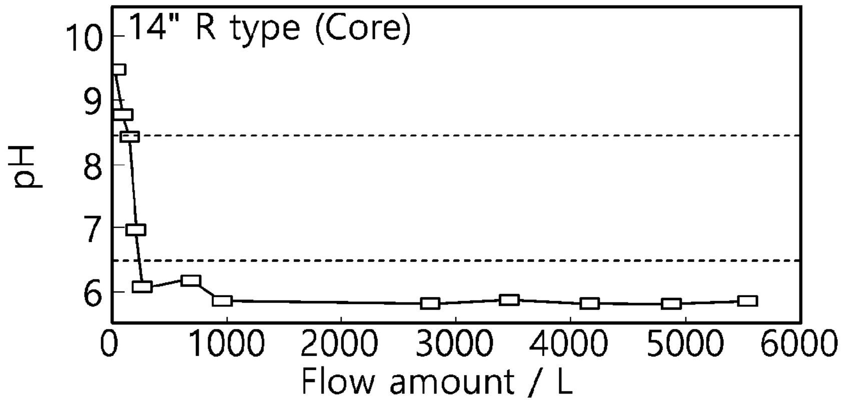
FIG. 5 is a graph measuring pH of purified water passing only through a water permeable filter in the absence of control particles by the amount of water flowed.

FIG. 5 is a graph measuring the pH of purified water that has passed through only the water permeable filter 110 when the vertical length of the water permeable filter 110 is 14 inches in the absence of the control particles 140 by the amount of water flowed.

As shown in FIG. 5, the purified water passing only through the water permeable filter 110 after passing through the reverse osmosis filter in the absence of the OH group-generating particles 142 and the cation exchange resin 144 represents a pH of 6.0 to 6.5, which is lower than the recommended pH range of 6.5 to 8.5.

Figure 6:
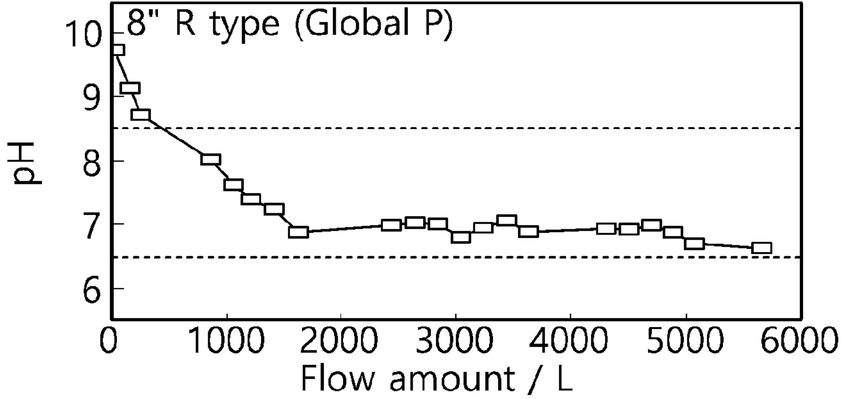
FIG. 6 is a graph measuring pH of purified water passing through a water permeable filter and OH group-generating particles by each amount of water flowed, in a state in which the vertical length of the water permeable filter is 8 inches and only OH group-generating particles are included among control particles.

FIG. 6 is a graph measuring the pH of purified water passing through the water permeable filter 110 and the OH group-generating particles 142 by each amount of water flowed, in a state in which the vertical length of the water permeable filter 110 is 8 inches and only the OH group-generating particles 142 are included among the control particles 140.

As can be seen from FIG. 6, the pH of the purified water passing through the water permeable filter 110 and the OH group-generating particles 142 satisfies a range of 6.5 to 8.5, which is a recommended pH range from about 400 L, i.e., amount of water flowed, and stably represents a value of about pH 7 from about 1500 L, i.e., amount of accumulated water flowed.

Figure 7:
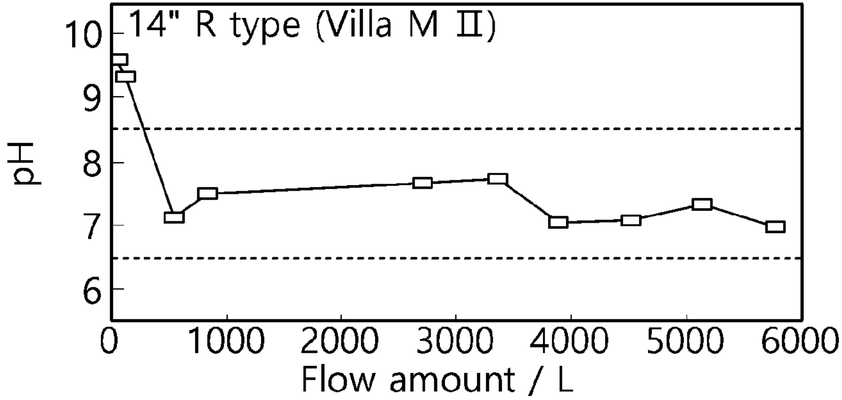
FIG. 7 is a graph measuring pH of purified water passing through a water permeable filter and control particles by each amount of water flowed in a state in which the vertical length of the water permeable filter is 14 inches and the control particles 140 include both OH group-generating particles and a cation exchange resin.

FIG. 7 is a graph measuring the pH of the purified water passing through the water permeable filter 110 and the control particles 140 by each amount of water flowed in a state in which the vertical length of the water permeable filter 110 is 14 inches and the control particles 140 include both the OH group-generating particles 142 and the cation exchange resin 144.

As can be seen from FIG. 7, the pH of the purified water passing through both the water permeable filter 110, the OH group-generating particles 142, and the cation exchange resin 144 is found to enter the recommended pH range at a faster time compared to the time when the OH group-generating particle 142 is included as the control particles 140 shown in FIG. 6, and is found to be stable at around 7.5 which is a median value of the recommended pH range.

Figure 8:
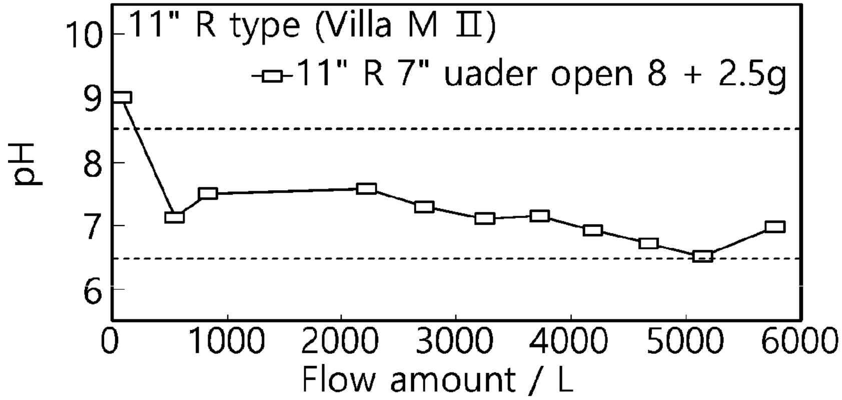
FIG. 8 is a graph measuring pH of purified water passing through a water permeable filter and control particles by each amount of water flowed in a state in which the vertical length of the water permeable filter is 11 inches and the control particles include both OH group-generating particles and a cation exchange resin.

FIG. 8 is a graph measuring the pH of the purified water passing through the water permeable filter 110 and the control particles 140 by each amount of water flowed in a state in which the vertical length of the water permeable filter 110 is 11 inches and the control particles 140 include both the OH group-generating particles 142 and the cation exchange resin 144.

As can be seen from FIG. 8, the pH of the purified water passing through both the water permeable filter 110, the OH group-generating particles 142, and the cation exchange resin 144 is found to enter the recommended pH range at a faster time compared to the time when the OH group-generating particle 142 is included as the control particles 140 shown in FIG. 6, and is found to be stable at a value of 7 to 7.5 which is a median value of the recommended pH range.

Figure 9:
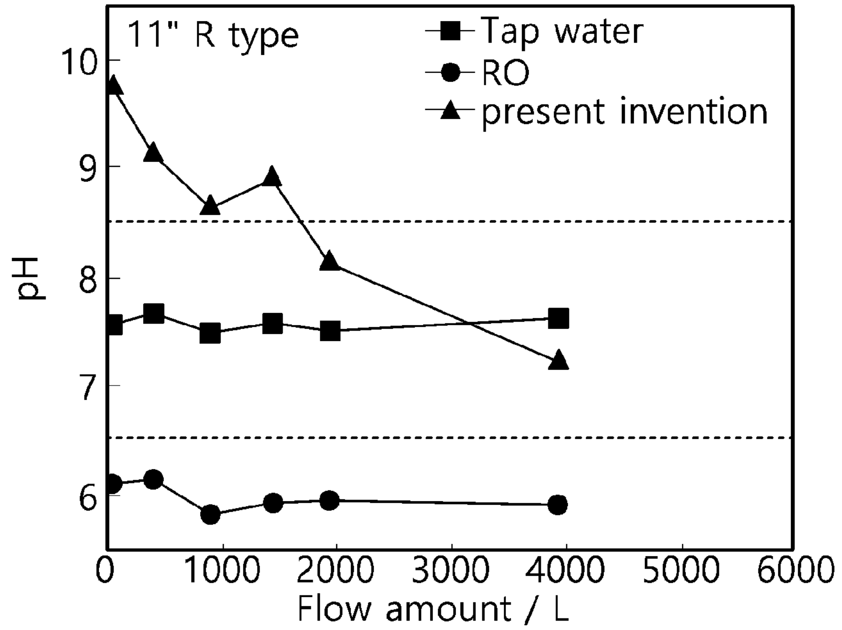
FIG. 9 is a graph measuring a change in pH according to the amount of water flowed through raw water, purified water that has passed through a reverse osmosis filter, and the purified water passing through control particles, when the vertical length of a water permeable filter is 11 inches and only OH group-generating particles are included in the control particles.

FIG. 9 is a graph measuring a change in pH according to the amount of water flowed through raw water (tap water), purified water (RO) that has passed through a reverse osmosis filter, and the purified water passing through the control particles 140, when the vertical length of the water permeable filter 110 is 11 inches and only the OH group-generating particles 142 are included in the control particles 140.

As shown in FIG. 9, when the pH of the raw water before becoming the purified water is about 7.5 and the pH of the purified water having passed through the reverse osmosis filter is about 6, the pH of the purified water having passed through the OH group-generating particles 142 as the control particles 140 continuously decreases from pH 10 but reaches a pH of 6.5 to 8.5, which is a recommended standard range after about 1,800 L, i.e., amount of water flowed.

Figure 10:
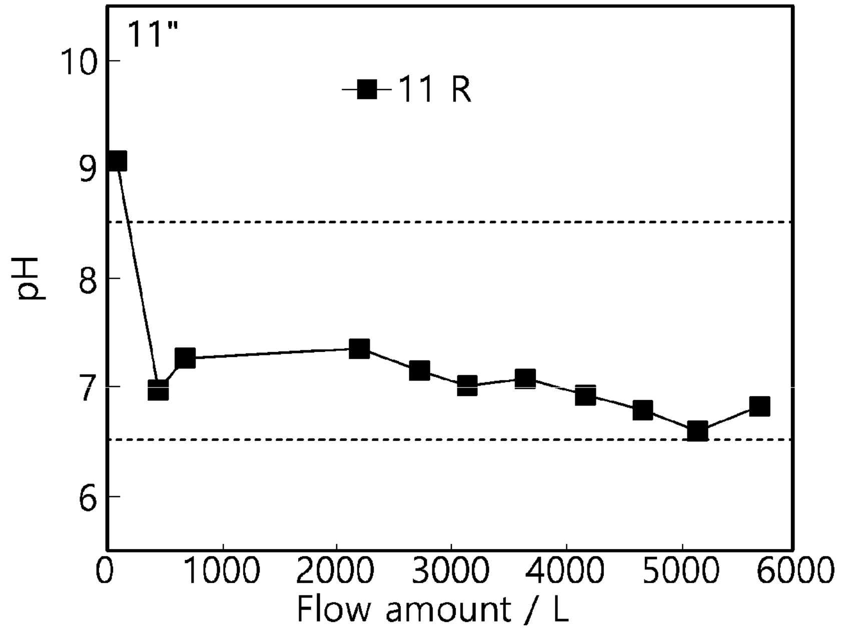
FIG. 10 is a graph measuring a change in pH according to the amount of water flowed through water purified by control particles when the vertical length of a water permeable filter is 11 inches and the control particles includes OH group-generating particles and a cation exchange resin.

FIG. 10 is a graph measuring a change in pH according to the amount of water flowed through the water purified by the control particles 140 when the vertical length of the water permeable filter 110 is 11 inches and the control particles 140 includes the OH group-generating particle 142 and the cation exchange resin 144.

When comparing only the OH group-generating particles 142 as the control particles 140 in FIG. 9 with the change in pH of the purified water, if the OH group-generating particles 142 and the cation exchange resin 144 are included as the controlling particle 140, the pH drops rapidly from 9 and reaches the recommended standard range of pH 6.5 to 8.5 when the amount of water flowed is about 500 L, and then has a tendency to be stabilized, so that the pH of the purified water reaches the recommended standard range more quickly and then maintains the recommended standard.

Figure 11:
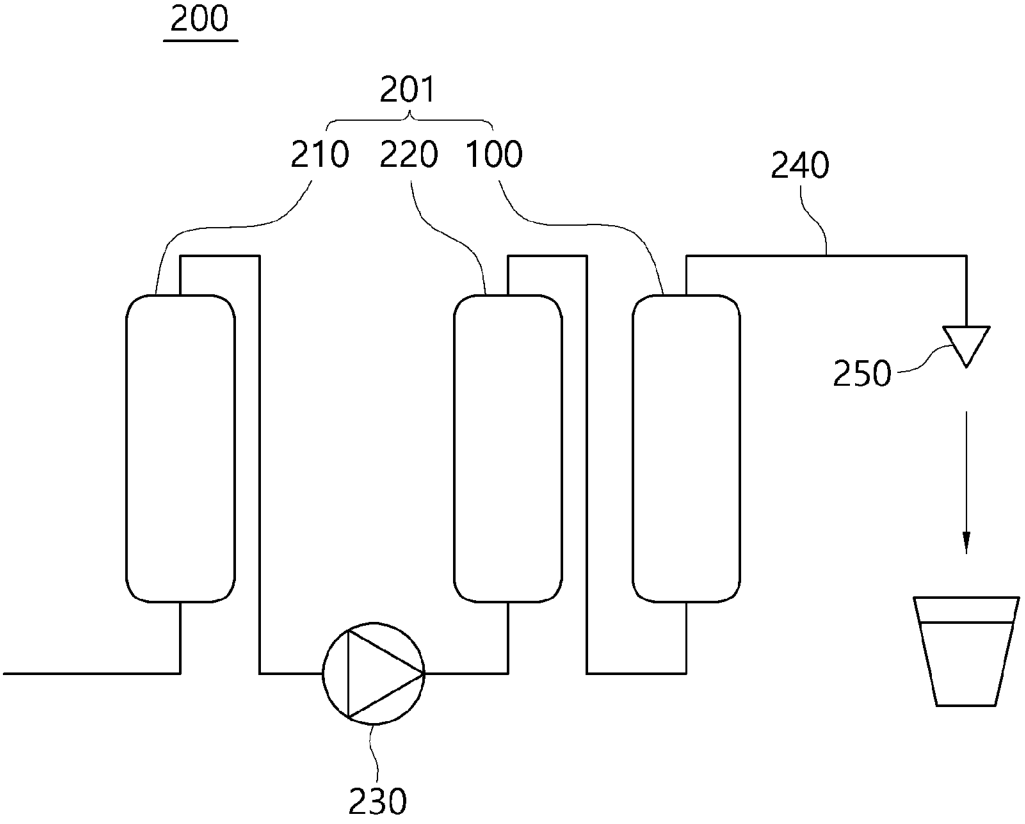
FIG. 11 is a block diagram of a direct water purifier including a pH-controlling filter according to another embodiment of the present disclosure.

FIG. 11 is a block diagram of a water purifier including a pH-controlling filter according to another embodiment of the present disclosure.

Referring to FIG. 11, the water purifier 200 including a pH-controlling filter according to another embodiment of the present disclosure may include a filter unit 201, a pump 230, and a water outlet nozzle 250.

The water purifier 200 according to the present embodiment may be a direct water purifier that directly extracts the purified water filtered through the filter unit 201 without storing the purified water.

The filter unit 201 may include a pre-treatment filter 210, a reverse osmosis filter 220, and a pH-controlling filter 100.

The pre-treatment filter 210 may be a filter for removing organic compounds and residual chlorine contained in the raw water or filtering foreign substances having large particles.

The reverse osmosis filter 220 may filter raw water in a reverse osmosis (RO) method by pressurizing the pump 230.

The pH-controlling filter 100 may be a filter for adjusting the pH of purified water within the recommended pH range, and may be installed on the downstream side of the reverse osmosis filter 220 to adjust the pH of the purified water filtered through the reverse osmosis filter 220.

The reverse osmosis (RO) filtration method may filter only pure water by filtering ions as well as minerals included in water, and because carbon dioxide included in water is combined with the water as the ions are removed, the pH of the water may be reduced to a level of 5.5 to 6.5, thereby making it weakly acidic.

Accordingly, the pH-controlling filter 100 is provided on the downstream side of the reverse osmosis filter 220 to adjust the pH of the purified water filtered through the reverse osmosis filter 220 to have a value within a recommended range (pH 6.5 to 8.5).

Of course, the pre-treatment filter 210 may not be provided as necessary, and another filter may be provided separately before or after the pH-controlling filter 100 as necessary.

Meanwhile, a pressure of a predetermined level or more is required in order for the raw water to be smoothly filtered in the reverse osmosis filter 220, and the pump 230 may pressurize the raw water directed to the reverse osmosis filter 220 with a pressure higher than the filtration pressure of the reverse osmosis filter 220.

Meanwhile, the water outlet nozzle 250 and a water outlet passage 240 may be provided.

As described above, since the water purifier 200 according to the present embodiment is a direct water purifier, the purified water having the pH adjusted by passing through the reverse osmosis filter 220 and the pH-controlling filter 100 may be guided to the water outlet nozzle 250 through the water outlet passage 240.

The water outlet nozzle 250 is a nozzle for extracting purified water to the outside of the water purifier 200, and the purified water having the pH adjusted to the recommended range may be provided to the user through the water outlet nozzle 250.

The water outlet nozzle 250 is provided to guide the purified water passing through the pH-controlling filter 100 to the water outlet nozzle, and the filtered purified water may be provided to the user directly without passing through a separate storage tank.

Of course, if necessary, a heating unit (not shown) and a cooling unit (not shown) for heating or cooling before purified water is provided to a user may be provided.

The reverse osmosis filter 220 and the pH-controlling filter 100 may have a lifespan, and may be provided to be replaceable so as to be replaced with a new filter when the lifespan has arrived.

In this case, the reverse osmosis filter 220 and the pH-controlling filter 100 may have the same or similar lifespan so that the pH-controlling filter 100 may be replaced when the reverse osmosis filter 220 arrives at the replacement cycle.

Accordingly, the user or administrator may be replaced once without having to separately replace the reverse osmosis filter 220 and the pH-controlling filter 100, thereby improving convenience.

Figure 12:
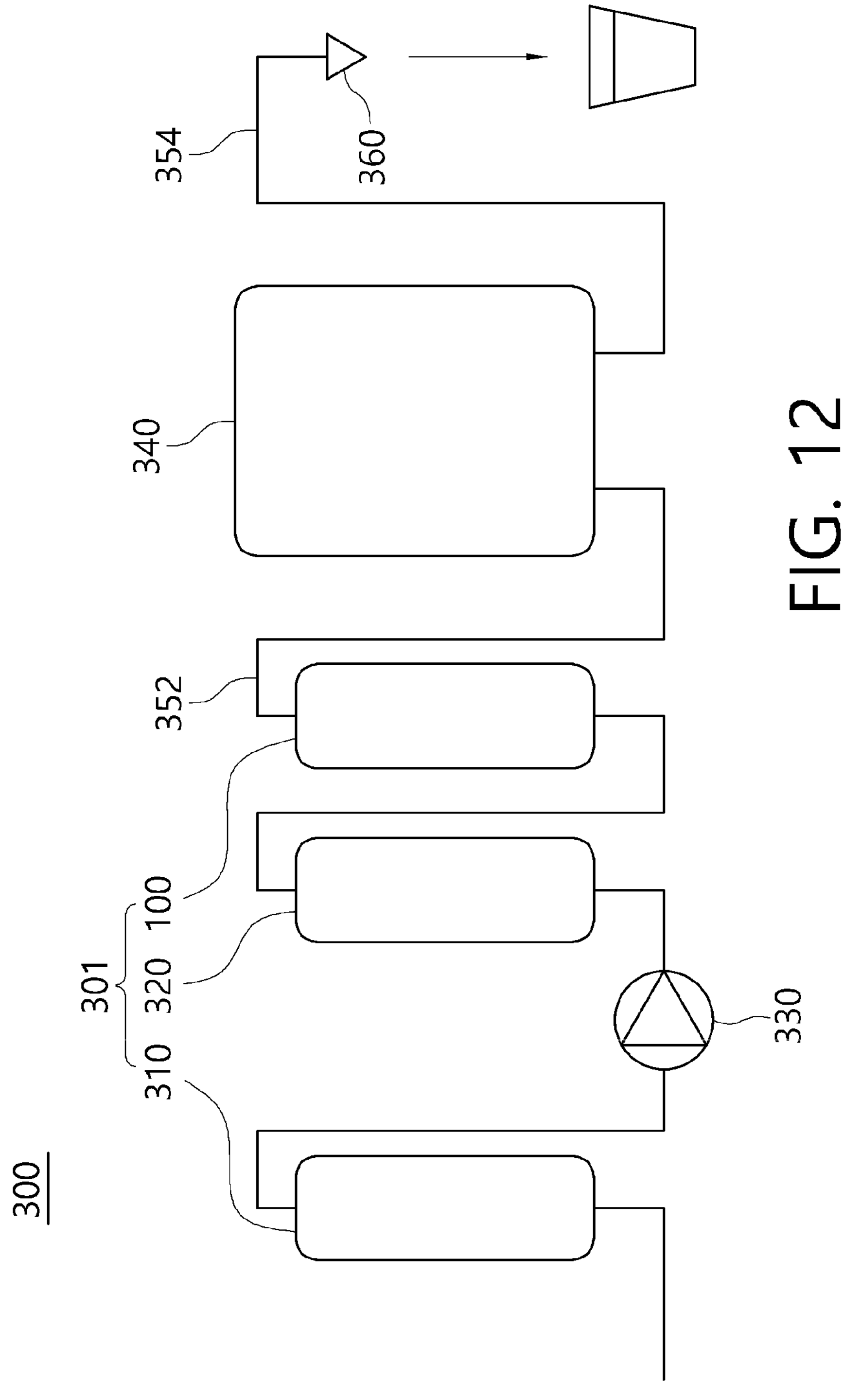
FIG. 12 is a block diagram of a direct water purifier including a pH-controlling filter according to another embodiment of the present disclosure.

FIG. 12 is a block diagram of a water purifier including a pH-controlling filter according to another embodiment of the present disclosure.

Referring to FIG. 12, a water purifier 300 including a pH-controlling filter according to another embodiment of the present disclosure may include a filter unit 301, a pump 330, and a purified water tank 340.

The water purifier according to the present embodiment may be a water storage type water purifier that stores filtered water in a tank and then provides the filtered water to a user.

Since the filter part 301 is the same as the filter unit 201 of the above-described embodiment, a detailed description thereof will be omitted. That is, the pH-controlling filter 100 is provided on the downstream side of the reverse osmosis filter 320 to adjust the pH so that the pH of the filtered purified water has a value within the recommended range (pH 6.5 to 8.5).

The pump 330 may pressurize the raw water directed to the reverse osmosis filter 320 to a filtration pressure higher than that of the reverse osmosis filter 320.

Since the water purifier 300 of the present embodiment is a water storage type water purifier, a purified water tank 340 for storing purified water whose pH is adjusted by passing through the reverse osmosis filter 320 and the pH-controlling filter 100 may be provided.

In addition, a purified water guide passage 352 for guiding purified water passing through the pH-controlling filter 100 to the purified water tank 430 may be provided.

In addition, a water discharge flow path 354 and a water outlet nozzle 360 may be provided to extract the purified water stored in the purified water tank 340.

The water outlet nozzle 360 is a nozzle for extracting purified water to the outside of the water purifier 300, and the purified water having a pH adjusted to a recommended range may be provided to a user through the water outlet nozzle 360.

In addition, a heating unit (not shown) and a cooling unit (not shown) for heating or cooling the purified water before the purified water is provided to the user may be provided, if necessary.

Although the embodiments of the present disclosure are described, the spirit of the present disclosure is not limited by the embodiments presented in the specification, and those skilled in the art who understand the spirit of the present disclosure may easily propose other embodiments by adding, modifying, deleting, and adding components within the same spirit, but the spirit of the present disclosure is also given.

100 pH-controlling filter
110 water permeable filter
112 hollow
120 filling unit
122 inlet
124 side aperture
126 outlet
128 inner space
130 lower stopper
140 control particles
142 OH group-generating particles
144 cation exchange resin

What is claimed is:

1. A filter for controlling a pH of purified water (pH controlling filter), the pH-controlling filter comprising:

a water permeable filter having a hollow formed in a center of a cross-section from one end to the other end in the longitudinal direction, the hollow having an inner circumferential surface;

a lower stopper closing a lower end of the water permeable filter;

a filling unit disposed in the hollow of the water permeable filter, the filling unit having an inner space therein, the filling unit having an inlet through which the purified water passing through the water permeable filter flows into the inner space and an outlet through which the purified water passing through the inner space flows out; and control particles filled in the inner space of the filling unit to adjust a pH of the purified water passing through the inner space of the filling unit, the control particles comprising:

hydroxyl (OH) group-generating particles configured to supplement the purified water passing through the inner space with hydroxyl (OH) groups; and a cation exchange resin configured to supplement cations in the purified water passing through the inner space of the filling unit;

wherein the outlet through which the purified water passing through the inner space flows out is located in a top surface of the filling unit, and wherein the inlet through which the purified water passing through the water permeable filter flows into the inner space is spaced apart from the outlet.

2. The pH-controlling filter of claim 1, wherein the hydroxyl (OH) group-generating particles are ceramic balls comprising magnesium or potassium.

3. The pH-controlling filter of claim 1, wherein the cation exchange resin comprises at least one of H+ form and Na+ form.

4. The pH-controlling filter of claim 1, wherein the control particles are filled in a volume of 30% to 80% of the volume of the inner space of the filling unit.

5. The pH-controlling filter of claim 1, wherein the filling unit is disposed in the hollow of the water permeable filter and having its inner space therein, its lower surface facing the lower stopper is closed, its side surface facing the inner circumferential surface of the hollow is formed with a plurality of slits serving as the inlet so as to be open, and its upper surface is open to discharge the purified water in its inner space to an upper side of the hollow of the water permeable filter.

6. The pH-controlling filter of claim 1, wherein the filling unit is disposed in the hollow of the water permeable filter and having its inner space therein, its lower surface facing the lower stopper is open to allow the purified water to flow into the inner space, its side surface facing the inner circumferential surface of the hollow is closed, and its upper surface is open to discharge the purified water in its inner space to an upper side of the hollow of the water permeable filter.

7. The pH-controlling filter of claim 1, wherein the filling unit is disposed in the hollow of the water permeable filter and having its inner space therein, its lower surface facing the lower stopper and its side surface facing the inner circumferential surface of the hollow are open to allow the purified water to flow into its inner space, and its upper surface is open to discharge the purified water in its inner space to an upper side of the hollow of the water permeable filter.

8. A water purifier comprising:

a reverse osmosis filter for filtering raw water; and a filter for controlling a pH of purified water (pH-controlling filter), which is installed on the downstream side of the reverse osmosis filter and configured to adjust the pH of the purified water filtered through the reverse osmosis filter, wherein the pH-controlling filter comprises:

a water permeable filter having a hollow formed in a center of a cross-section from one end to the other end in the longitudinal direction, the hollow having an inner circumferential surface;

a lower stopper closing a lower end of the water permeable filter;

a filling unit disposed in the hollow of the water permeable filter, the filling unit having an inner space therein, the filling unit having an inlet through which the purified water passing through the water permeable filter flows into the inner space and an outlet through which the purified water passing through the inner space flows out; and control particles filled in the inner space of the filling unit to adjust a pH of the purified water passing through the inner space of the filling unit, the control particles comprising:

hydroxyl (OH) group-generating particles configured to supplement the purified water passing through the inner space with hydroxyl (OH) groups; and a cation exchange resin configured to supplement cations in the purified water passing through the inner space of the filling unit, wherein the outlet through which the purified water passing through the inner space flows out is located in a top surface of the filling unit, and wherein the inlet through which the purified water passing through the water permeable filter flows into the inner space is spaced apart from the outlet.

9. The water purifier of claim 8, further comprising:

a water outlet nozzle configured to discharge the purified water having a pH adjusted by the pH-controlling filter; and a water outlet flow path configured to guide the purified water passing through the pH-controlling filter to the water outlet nozzle.

10. The water purifier of claim 8, further comprising:

a purified water tank in which the purified water having the pH adjusted in the pH-controlling filter is stored; and a purified water guide flow path for guiding the purified water passing through the pH-controlling filter to the purified water tank.

* * * * *